(12) United States Patent
Mouatt

(10) Patent No.: US 7,972,403 B2
(45) Date of Patent: Jul. 5, 2011

(54) ROTATE-ONCE OUTLET FITTING FOR A FILTER HOUSING

(75) Inventor: Gerard Mouatt, Kalamazoo, MI (US)

(73) Assignee: Mann + Hummel GmbH, Ludwigsburg (DE)

(*) Notice: Subject to any disclaimer, the term of this patent is extended or adjusted under 35 U.S.C. 154(b) by 499 days.

(21) Appl. No.: 12/189,889

(22) Filed: Aug. 12, 2008

(65) Prior Publication Data

US 2010/0037575 A1    Feb. 18, 2010

(51) Int. Cl.
B01D 46/00 (2006.01)
B01D 46/02 (2006.01)
F16L 37/00 (2006.01)

(52) U.S. Cl. .......... 55/505; 55/498; 55/503; 55/507; 210/435; 210/437; 210/441; 210/443; 285/305; 285/321

(58) Field of Classification Search .......... 55/495, 55/498, 502, 503, 504, 505, 507, 510; 210/435, 210/437, 440, 441, 443, 444; 285/272, 282, 285/305, 321

See application file for complete search history.

(56) References Cited

U.S. PATENT DOCUMENTS

| | | | |
|---|---|---|---|
| 5,700,304 A * | 12/1997 | Foo | 55/337 |
| 5,882,367 A | 3/1999 | Morgan et al. | |
| 6,039,778 A * | 3/2000 | Coulonvaux | 55/498 |
| 6,139,607 A | 10/2000 | Coulonvaux | |
| 6,299,661 B1 * | 10/2001 | Bloomer | 55/385.3 |
| 6,334,887 B1 * | 1/2002 | Coulonvaux | 95/273 |
| 7,008,467 B2 * | 3/2006 | Krisko et al. | 95/268 |
| 7,491,254 B2 * | 2/2009 | Krisko et al. | 55/337 |
| 7,604,128 B2 * | 10/2009 | Dworatzek et al. | 210/455 |
| 7,645,310 B2 * | 1/2010 | Krisko et al. | 55/337 |
| 7,784,836 B2 * | 8/2010 | Dworatzek et al. | 285/272 |
| 2007/0240393 A1 * | 10/2007 | Dworatzek et al. | 55/495 |
| 2007/0284301 A1 | 12/2007 | Dworatzek et al. | |
| 2009/0100813 A1 * | 4/2009 | Iddings et al. | 55/489 |

\* cited by examiner

*Primary Examiner* — Robert A Clemente
(74) *Attorney, Agent, or Firm* — James Hasselbeck

(57) ABSTRACT

A filter apparatus includes a filter housing having at least one opening and a plurality of retention tabs positioned proximate to at least one of the openings and secured to the filter housing. Also included is a connection fitting having a tube segment sized and configured to be received into at least one opening of the filter housing, orientation tab or tabs secured to the connection fitting and positioned to be engageable between a portion of the plurality of retention tabs when in the installed position. A retention flange extends radially from the tube segment and is configured to retentively engage with the retention tabs to secure the connection fitting to the filter housing. The connection fitting is rotatable when the tube segment is received into the filter housing but is then rotationally locked relative to the filter housing when in the installed position.

11 Claims, 6 Drawing Sheets

ROTATE-ONCE OUTLET FITTING FOR A FILTER HOUSING

TECHNICAL FIELD

The present invention relates to filter elements and housings and, more particularly, to filter housings having positionable connection fittings.

BACKGROUND OF THE INVENTION

The present invention relates to a filter apparatus, particularly to filter housings and filter housing components for filtering intake air for internal combustion engines and other uses where a filtered, particulate free clean air source is beneficial. Air filter elements and filter housings are known in the art, and as particularly related to this application, filter apparatus are known having generally cylindrical housing including a tangential or alternately radial inlet fitting secured onto a side of the housing and an outlet fitting secured to an axial end of the housing.

U.S. Pat. No. 5,882,367 discloses a filter apparatus in which a filter cartridge is disposed in a substantially cylindrical housing. On the lateral surface of the filter housing, an inlet opening is provided which communicates with an annular space formed between the filter cartridge and the housing. Within the filter cartridge, a chamber is formed from which the filtered air is discharged through an outlet fitting. The outlet fitting is secured in a snap-in relation to an axial end face of the housing by a "V" shaped retention feature. An "O" ring seal is provided between the outlet fitting and the filter housing.

U.S. Published Patent Application 2007/0284301 discloses a filter apparatus including a housing and a filter insert with an inlet opening formed on the housing and an outlet fitting mounted on a housing wall. The outlet fitting has a contact face for contact with the housing and is provided with a tubular segment, which protrudes through an opening of the housing. A mounting element is attached to the tubular segment such that a region of the housing surrounding the opening is clamped between the contact face of the outlet fitting and the mounting element.

In known filter housings that are provided with an axial outlet fitting or tube mounted to the filter housing in a snap-in relation, the outlet fitting remains rotatable relative to the housing after snap-in installation. In certain applications the geometry and layout of nearby and connecting components in the final installation typically dictate the required rotational position of the outlet fitting on the filter housing and therefore, rotation of the outlet fitting during shipping or installation is undesirable. Additionally, engine vibration can lead to an undesirable rotation of the outlet fitting relative to the housing during vehicle operation. This can lead to a potential decoupling of the engine clean air intake piping from the outlet fitting, compromising required engine intake air filtration.

SUMMARY OF THE INVENTION

The present invention provides an improved filter apparatus in which the outlet fitting is configured to be rotatable to any of a plurality of positions during assembly of the outlet fitting onto the filter housing. Once assembled the present invention locks the tube into a fixed rotational position relative to the filter housing thereby preserving the intended rotational alignment of the outlet fitting to the filter housing.

The filter apparatus includes a filter housing having at least one opening and a plurality of retention tabs positioned proximate to the openings and secured to the housing. A connection tube fitting is also provided. The connection tube fitting may be either an inlet fitting, an outlet fitting or both. The connection fitting includes a tube segment sized and configured to be received into at least one of the opening of the filter housing. The connection fitting also includes at least one orientation tab secured to the connection fitting and positioned to be engageable between a portion of the plurality of retention tabs when in the installed position. A retention flange is provided extending radially from the tube segment and is sized and configured to retentively engage with the retention tabs when the fitting is in the installed position. The engagement between the retention tabs and retention flange is advantageously operable to permanently secure or mount the connection fitting to the filter housing. The connection fitting is rotatable about an axis of the filter housing opening relative to the filter housing when the tube segment is received into the filter housing in a non-installed position (i.e. it is not fully installed into the housing, retention tabs not engaging the retention flange). Advantageously, the engagement between the orientation tab or tabs and the retention flange is operable to limit rotation of the connection fitting over a limited angular range, or in other cases fix the rotation of the connection fitting relative to the filter housing when in the installed position.

According to one aspect of the invention, the retention flange of the tube section further includes a retention bevel. The retention bevel is sized and configured to urge at least a portion of the retention tabs to deflect sufficiently during connection fitting installation to permit the retention tabs to retentively engage with the retention flange. The retention tabs are made of material sufficiently elastic to permit their deflection against the retention bevel.

According to another aspect of the invention, the retention tabs are positioned to extend radially inward into the filter housing opening. The retention tabs have a "J" shape with a top portion of the "J" configured to retentively engage the retention flange of the connection fitting and have a leg portion that is operable to be deflected by the retention bevel during installation of the connection fitting in the filter housing.

According to another aspect of the invention, the filter housing further includes an annular flange disposed radially around the at least one opening. The tube segment is provided with an annular flange extending radially from the connection fitting, the annular flange of the connection fitting sized and configured to closeably mate with the annular flange of the filter housing when in the installed position.

According to another aspect of the invention, the orientation tabs are secured to at least one of the tube segment or the annular flange of the connection tube.

According to another aspect of the invention, the connection fitting is an outlet connection fitting; and further includes a sensor fitting secured to the outlet fitting. The sensor fitting has an opening therethrough in fluid communication with an interior portion of the outlet connection.

According to another aspect of the invention, the retention tabs are disposed in a spaced relationship about the opening in the filter housing. The spaced relationship thereby permitting selection of an intended rotational lock position from a plurality of lockable rotational positions of the connection fitting relative to the filter housing.

According to another aspect of the invention, the orientation tabs are disposed in a spaced relationship about the tube segment thereby permitting selection of an intended rotational lock position from a plurality of lockable rotational positions of the connection fitting relative to the filter housing.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
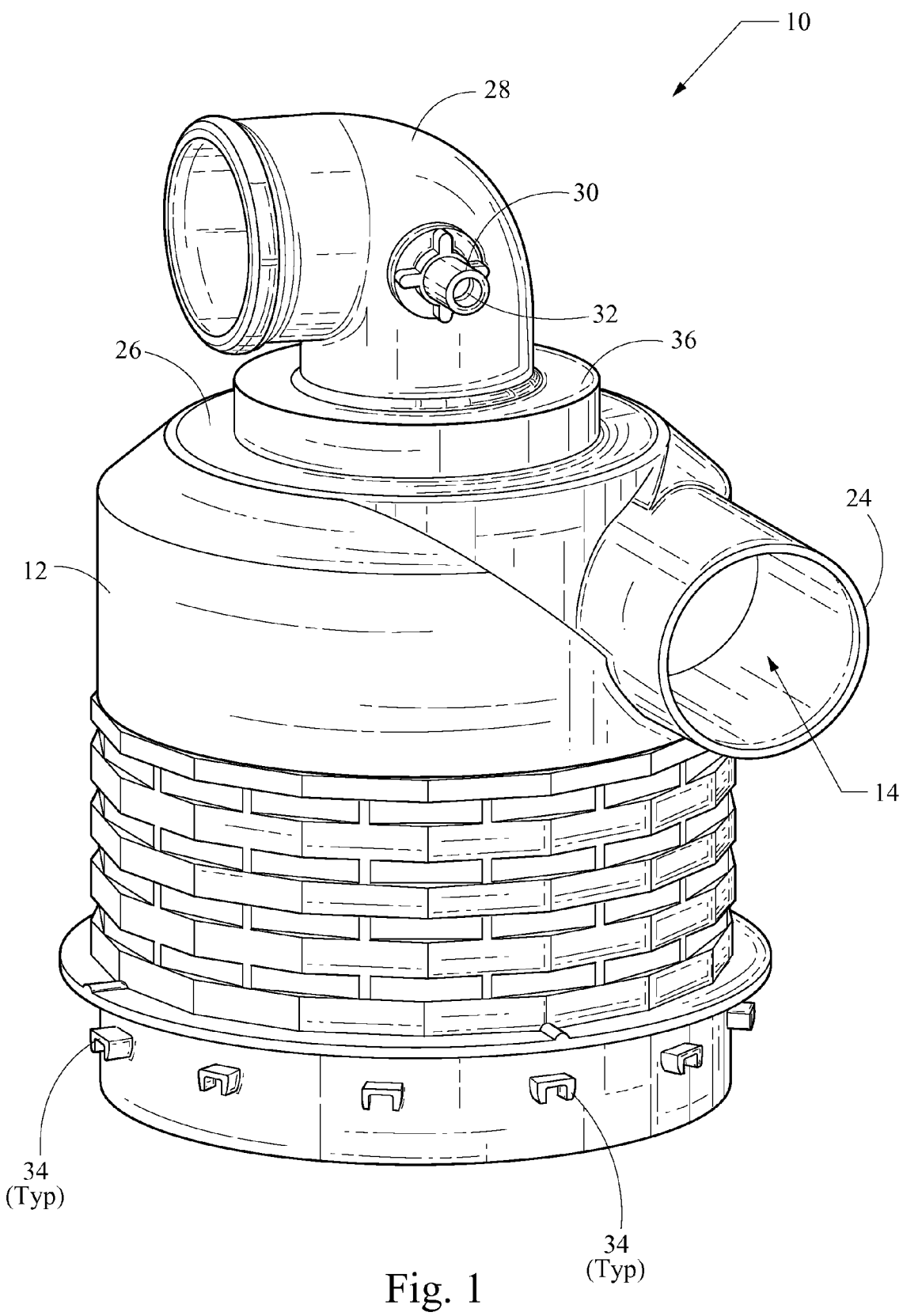
FIG. 1 is a perspective assembled view of a filter housing having an outlet fitting secured in a snap-fit, rotate-once relationship with the filter housing, consistent with the present invention.
Figure 2A:
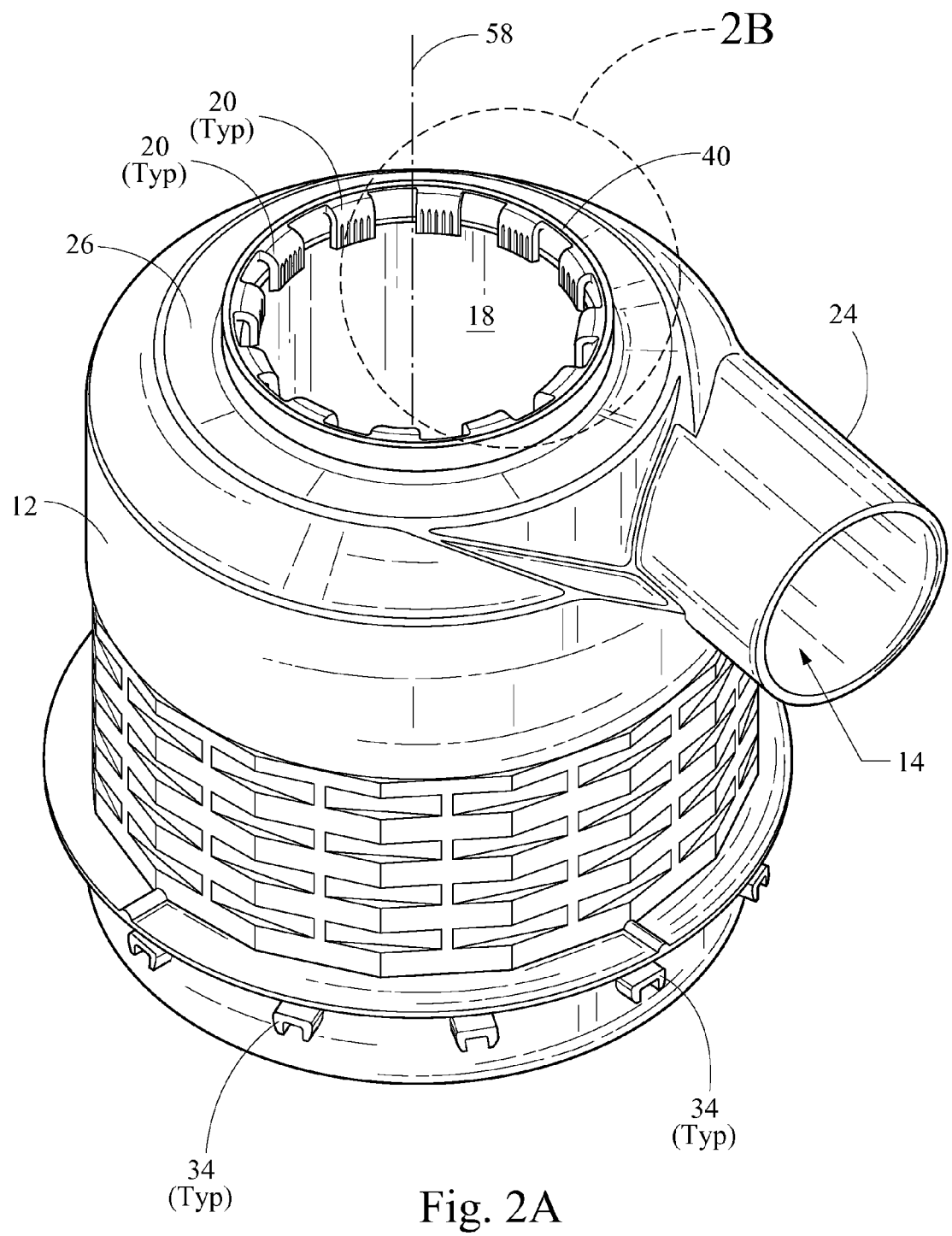
FIG. 2A is a perspective view of the filter housing depicted in FIG. 1 without the outlet fitting, showing the retention tabs consistent with the present invention.
Figure 2B:
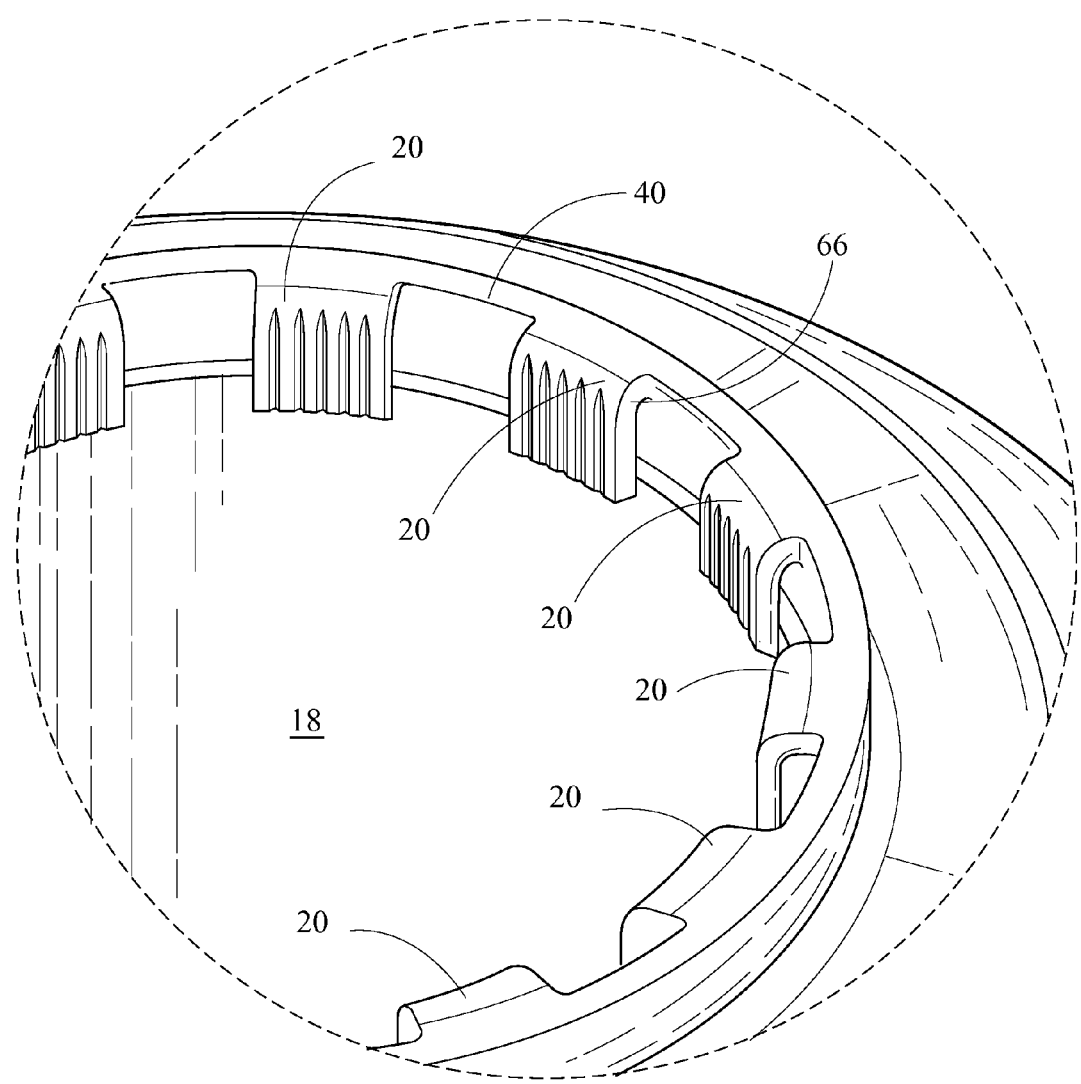
FIG. 2B provides an enlarged detail view of the outlet opening of the filter housing depicted in FIG. 2A, better illustrating the outlet fitting retention tabs consistent with the present invention.

The discussion is now directed to FIGS. 1, 2A and 2B. FIG. 1 is a perspective assembled view of a filter apparatus 10 including a filter housing 12 which is substantially cylindrical in shape. FIG. 2A is a perspective view of the filter housing depicted in FIG. 1 with the outlet fitting 28 removed, showing the retention tabs 20 consistent with the present invention. FIG. 2B provides an enlarged detail view of the outlet opening of the filter housing depicted in FIG. 2A, better illustrating the outlet fitting retention tabs.

Filter apparatus 10 is depicted as having a substantially cylindrical filter housing 12. The invention is not limited to use with cylindrical filter housings but may instead be advantageously applied to any shape of filter housing. On the lower margin of the filter housing 12 a number of projections 34 are disposed. The projections 34 provide a retention means for removably securing a lower housing portion (not shown) to the filter housing 12. The lower housing portion is removable from the housing 12 to provide for replacement of the filter element (not shown) in the filter housing 12. On the lateral surface of the filter housing 12, an inlet fitting 24 is provided. An inlet opening 14 is formed into the filter housing 12 about which the inlet fitting 24 is disposed. The inlet fitting 24 is illustrated with a generally cylindrical tubular shape and is aligned so as to direct air flow into the filter housing in a substantially tangential direction relative to the cylindrical axis of the filter housing 12.

At an end face 26 of the housing 12 an outlet fitting 28 is disposed. A sensor fitting 30 is disposed on the outlet fitting 28 and has an opening 32 therethrough in fluid communication with an interior portion of the outlet fitting 28. A sensor, for example, a pressure switch or pressure transmitter device (not shown) may be connected to the sensor fitting 30 to enable monitoring of the performance and state of the filter element (not shown) in the filter housing 12. As is well known, filter elements operate to remove debris such as particulates from a fluid stream such as, for one example, an air stream. These removed particulates generally accumulate in the filter element, thereby impeding fluid flow through the filter element and increasing the pressure drop across the filter element. Increasing pressure drop through the filter element as measured by the outlet pressure is indicative of an increasingly occluded filter element and provides an indication of when the filter is in need of replacement.

The outlet fitting 28 in its depicted position in FIG. 1 is shown as installed into filter housing 12. In the present invention, the outlet fitting 28 is in a fixed rotational relationship relative to the filter housing 12 after installation. Prior to complete installation into the filter housing 12, the outlet fitting is free to rotate relative to the end face 26 of the housing, as will be shown and discussed in further detail below.

As can be seen particularly in FIGS. 2A and 2B, the outlet opening 18 in end face 26 is circumscribed by an annular flange 40. Disposed and secured proximate to the interior of the annular flange 40 and facing the outlet opening 18 are a number of retention tabs 20. Retention tabs 20 are illustrated in a spaced relationship about the periphery of outlet opening 18 and are secured to the outlet face 26 together with the annular flange 40. The retention tabs in this specific embodiment are generally "J" shaped and have a leg portion 66 that is deflectable. The filter housing 12 including the end face 26, annular flange 40 and retention tabs 20 may be formed as a unit in a process such as injection molding or may be assembled from a number of individual components. The retention tabs 20 are formed of a resilient material so that the retention tabs 20 are operable to be deflected slightly to permit the retention bevel 44 and retention flange 42 to pass (see FIG. 3A) and can then return to their original form so as to engage the retention flange 42 during installation of the outlet fitting 28 into the outlet opening 18 of the filter housing 12, as will be discussed with FIG. 3A.

Figure 3A:
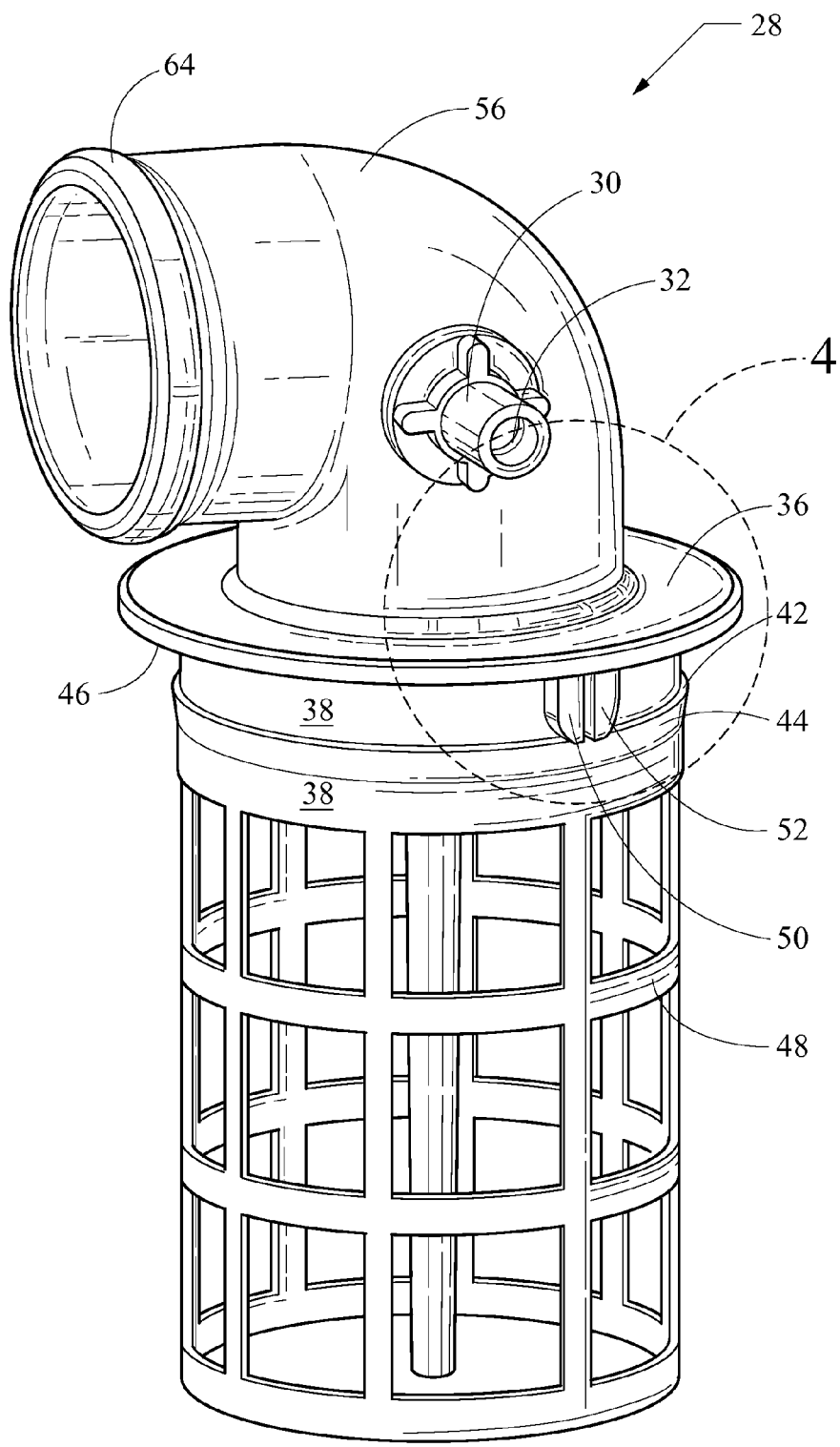
FIG. 3A is a perspective view of the outlet fitting assembly depicted in FIG. 1, shown separated from the filter housing and particularly illustrating the orientation tabs and retention flange and bevel consistent with the present invention.

FIG. 3A provides a side view of the outlet fitting 28 depicted in FIG. 1, shown separated from the filter housing and particularly illustrating the orientation tab or tabs 50 and 52, tube segment 38, retention flange 42 and bevel 44 consistent with the present invention. Sensor fitting 30 is secured to the outlet fitting 28. A sensor fitting 30 is disposed on a mid portion 56 of the outlet fitting 28 and has an opening 32 therethrough in fluid communication with an interior portion of the outlet fitting 28. A connection adapter 64 is secured to an end of the outlet fitting 28. Provided on an opposing end of the outlet fitting 28 is a support grid 48, sized and configured to allow insertion into an interior portion of a filter element (not shown) inside the housing 12. A tube segment 38 extends between the support grid 48 and the annular flange 36. The annular flange has an axial face 46 that is sized and configured to closeably mate with the annular flange 40 of the filter housing 12 (see FIG. 2A). At least one orientation tab, such as orientation tab pair 50 and 52 (first orientation tab and second orientation tab respectfully), are disposed proximate to the tube section 38 and have a least a first portion of each orientation tab 50,52 secured to the outlet fitting 28. The orientation tab or tabs 50, 52 may have first portion secured to the axial face 46 of annular flange 36, or may alternately have a first portion secured to an outer surface of the tube segment 36, or alternately may be secured to both the axial face 46 and to the outer surface of tube segment 36. The orientation tab or orientation tabs 50 and 52 may be formed onto or molded with the outlet fitting 28, or may be adhesively secured onto the outlet fitting 28. The orientation tabs 50,52 may also be provided on the outlet fitting by overmolding the orientation tabs 50,52 onto the outlet fitting 28. Alternately the orientation tabs 50,52 may be secured to the outlet fitting 28 using any method as would be known to one skilled in the art.

Figure 4:
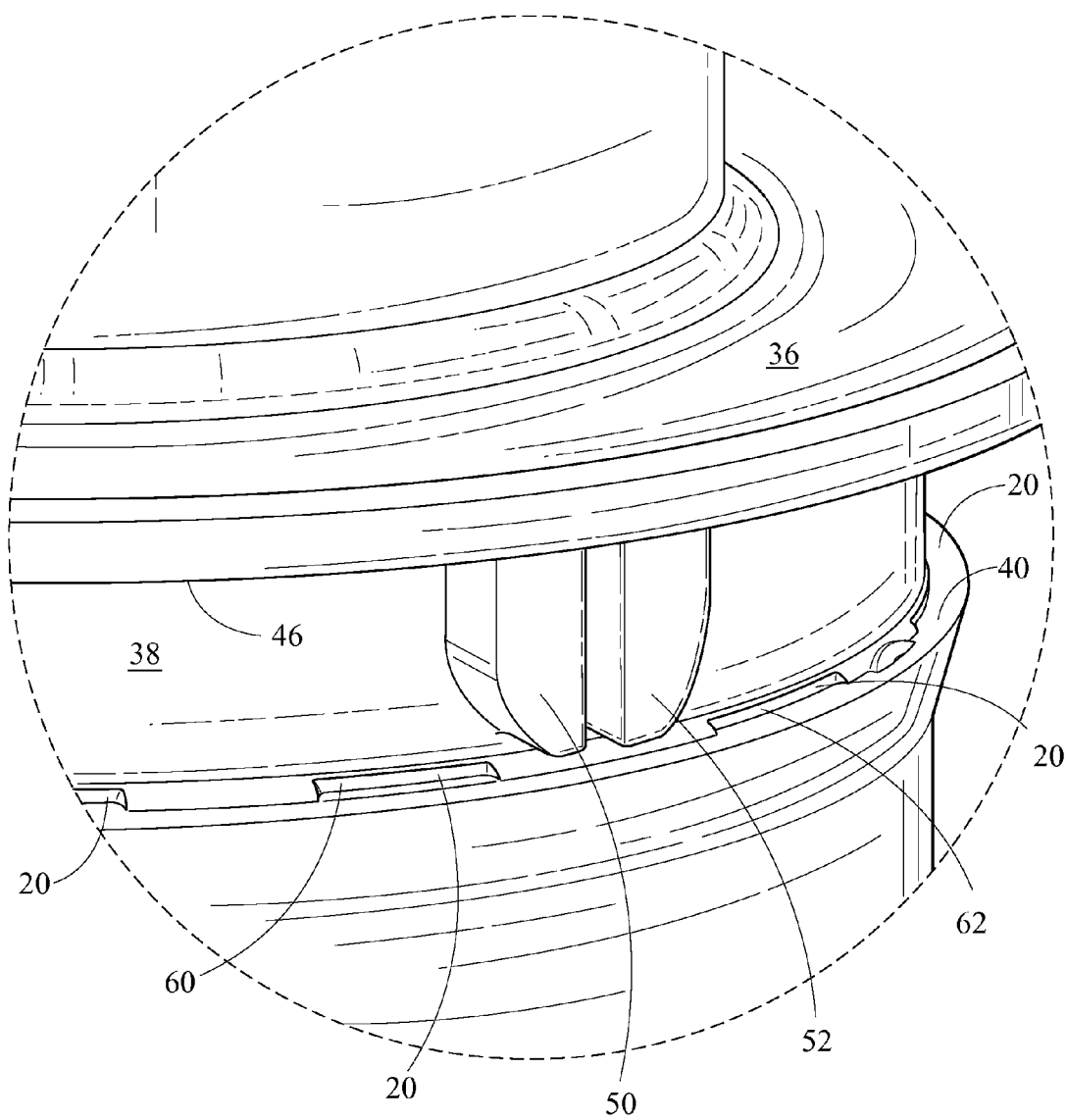
FIG. 4 is an enlarged detail of a portion of the filter housing at the outlet opening of the housing and the outlet fitting positioned partially into the filter housing, positioned to permit rotational alignment of the outlet fitting prior to performing a snap in retentive lock and rotational lock of the outlet fitting into the filter housing, consistent with the present invention.

FIG. 4 is an enlarged detail of a portion of the filter housing 12 about the outlet opening 18 (see FIG. 2A) of the housing 12 and the outlet fitting 28 partially inserted into the filter housing 12. In the insertion position illustrated in FIG. 4, the outlet fitting 28 is free to rotate about the axis 58 of the outlet opening (see FIG. 2A), permitting the outlet fitting 28 to be rotationally positioned relative to filter housing 12 before completing insertion of the outlet fitting 28 into the outlet opening 18 of the filter housing 12. Outlet fitting 28 is free to rotate as orientation tabs 50,52 are not engaged between adjacent retention tabs 60,62. In FIG. 4, after the outlet fitting 28 is rotated to a desired or rotational position relative to filter housing 12, the first orientation tab 50 and second orientation tab 52 are positioned to be received between any adjacent retention tabs such as the two adjacent retention tabs 60 and 62 of the plurality of retention tabs 20 disposed about the annular flange 40 of filter housing 12. The retention tabs 20 are more clearly seen in FIG. 2A. The outlet fitting may then be retentively engaged into the filter housing by urging the annular flange 36 of the outlet fitting 28 into a confronting proximate relationship with the annular flange 40 of the filter housing. The annular flanges 36 and 40 are configured to closeably mate in a complimentary fashion to provide a closure substantially sealed against the passage of air between the annular flanges 36 and 40. Orientation tabs 50 and 52 are secured onto the outer surface of the tube section 38 and extend generally downwards from the axial face 46 of annular flange 36 of the outlet fitting. FIG. 3A illustrates a complimentary pair of orientation tabs 50 and 52. It is envisioned that orientation tabs may be provided in configurations other than complimentary pairs. For example, a single orientation tab may be used, or the orientation tabs 50 and 52 may be formed as a single one piece orientation tab, or other arrangements as would be known to those skilled in the art. In the illustrated embodiment, upper portions of the orientation tabs 50 and 52 are secured to the axial face 46, and back portions of orientation tabs 50 and 52 are secured to the outer surface of tube segment 38. It is to be understood that the orientation tabs 50 and 52 may be secured to either the tube segment 38, the annular flange 36 or to both. The orientation tabs 50 and 52 are sized, spaced and aligned to be receivable between adjacent retention tabs 60 and 62 as discussed earlier with FIG. 4. The orientation tabs 50 and 52 may be formed as a unit with the tube section 38 and/or annular flange 36 using a process such as injection molding, overmolding or may be assembled from a number of individual components by methods such as adhesive mounting, ultrasonic or friction welding or other methods as are known to those skilled in the art.

The discussion now turns to FIGS. 3A and 2A. FIG. 3A depicts a retention flange 42 and retention bevel 44 radially disposed about at least a portion of the exterior surface of tube segment 38 and secured to the tube segment 38 of the outlet fitting. The retention flange and bevel are positioned to retentively and cooperatively engage with retention tabs 20 of the filter housing 12 when the annular flanges 36 and 40 are urged into a sealing confronting relationship. The cooperative interaction of the bevel 44, retention flange 42 with the retention tabs 20 provide a snap locking installation of the outlet fitting 28 onto the filter housing 12. The retention tabs 20 and retention flange 42 provide a one-time snap together assembly in that the outlet fitting 28 can not be separated from the filter housing 12 without mechanically damaging the filter housing and/or outlet fitting assembly.

Figure 3B:
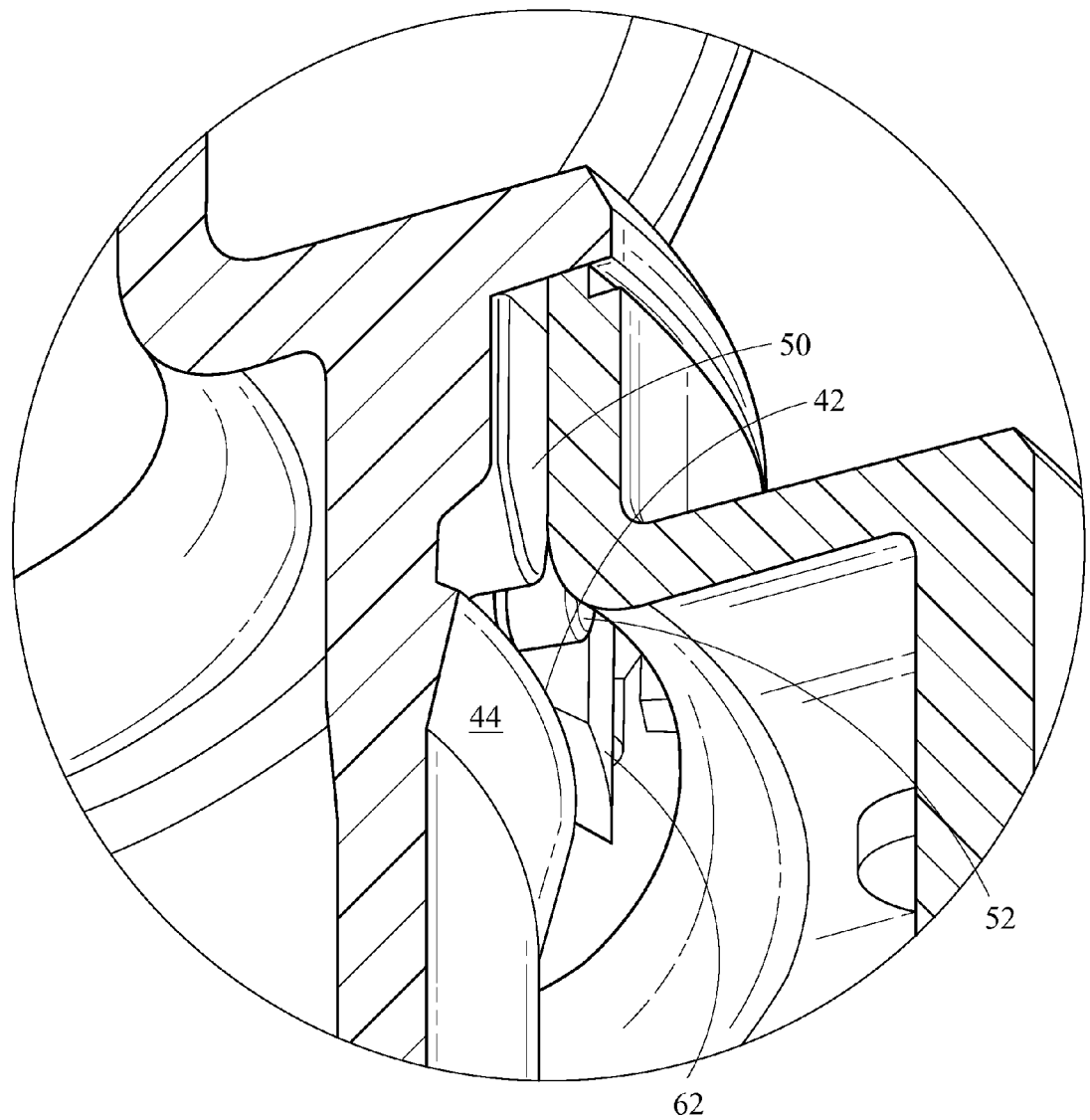
FIG. 3B is a cutaway view of a portion of the outlet fitting of FIG. 3A and the filter housing of FIG. 2A after installation of the outlet fitting into the filter housing.

Turning now to FIG. 3B. FIG. 3B is a cutaway view of the outlet fitting (FIG. 3A) after snap lock installation into filter housing 12 (FIG. 2A). First and second orientation tabs 50 and 52 extend between retention tab 62 and the adjacent retention tab 60 (not visible as cut away in FIG. 3B but clearly visible in FIG. 4). Retention tab 20 retentively engages retention flange 42 of the outlet fitting to retentively lock the outlet fitting 28 (FIG. 3A) into the sealing confronting relationship with filter housing 12 (FIG. 2A). The extension of orientation tabs 50 and 52 between the adjacent retention tabs 60 and 62 limits or in other cases prevents further rotation of the outlet fitting 28 (FIG. 3A) relative to the filter housing (FIG. 1) after snap lock installation, advantageously locking the outlet fitting 28 into the desired rotational alignment relative to filter housing 12 as may be required for installation in the intended application.

It is preferred that the material of the retention tabs 20 have sufficient elasticity to permit the retention tabs 20 to be urged by the retention bevel 44 to slightly positionally deflect during snap fit installation and then return to their original undeflected state so as to engage the retention flange 42, as shown in FIG. 3B.

While the best modes for carrying out the invention have been described in detail, those familiar with the art to which this invention relates will recognize various alternative designs and embodiments for practicing the invention within the scope of the appended claims.

The invention claimed is:

1. A filter apparatus comprising:
   a filter housing having at least one opening;
   a plurality of retention tabs positioned proximate to at least one of said openings and secured to said filter housing;
   a connection fitting having:
     a tube segment sized and configured to be received into at least a portion of said at least one opening of said filter housing when in an installed position;
     at least one orientation tab secured to said connection fitting and positioned to be engageable between a portion of said plurality of retention tabs when in said installed position;
     a retention flange extending radially from said tube segment, said retention flange sized and configured to retentively engage with at least a portion of said retention tabs when in said installed position, said engagement of said retention tabs with said retention flange securing said connection fitting to said filter housing;
   wherein said connection fitting is rotatable about an axis of said at least one opening relative to said filter housing when said tube segment is received into said filter housing in a non-installed position; and
   wherein engagement between said at least one orientation tab and a portion of said retention flanges is operable to limit rotation of said connection fitting relative to said filter housing when in said installed position.

2. The filter apparatus of claim 1, wherein said engagement between said at least one orientation tab and a portion of said retention flanges is operable to permanently lock rotational position of said connection fitting relative to said filter housing when in said installed position.

3. The filter apparatus of claim 1, wherein:
said retention flange of said tube section further includes a retention bevel, said retention bevel sized and configured to urge at least a portion of said retention tabs to deflect sufficiently during connection fitting installation to permit said retention tabs to retentively engage said retention flange; and wherein
said retention tabs are sufficiently elastic to permit said deflection.

4. The filter apparatus of claim 3, wherein
said retention tabs are positioned to extend radially inwardly into said at least one opening;
wherein said retention tabs have a "J" shape with a top portion of said "J" configured to retentively engage said retention flange of said connection fitting; and
wherein a leg portion of said "J" shaped retention tabs is deflected by said retention flange during installation of said connection fitting in said filter housing.

5. The filter apparatus of claim 4, wherein:
said filter housing further includes an annular flange disposed radially around said at least one opening;
said tube segment further includes an annular flange extending radially from connection fitting, said annular flange of said connection fitting sized and configured to closably mate with said annular flange of said filter housing when in said installed position.

6. The filter apparatus according to claim 5, wherein said at least one orientation tab is secured to at least one of said tube segment or said annular flange of the connection tube.

7. The filter apparatus according to claim 1, wherein
said connection fitting is an outlet connection fitting; and
said outlet connection fitting further includes a sensor fitting secured to said outlet connection, said sensor fitting having an opening therethrough in fluid communication with an interior portion of said outlet connection.

8. The filter apparatus of claim 1, wherein:
said retention tabs are disposed in a spaced relationship about said at least one opening, said spaced relationship permitting selection of an intended rotational lock position from a plurality of lockable rotational positions of said connection fitting relative to said filter housing.

9. The filter apparatus of claim 1, wherein:
said at least one orientation tab comprises a plurality of orientation tabs that are disposed in a spaced relationship about said tube segment, said spaced relationship permitting selection of an intended rotational lock position from a plurality of lockable rotational positions of said connection fitting relative to said filter housing.

10. The filter apparatus according to claim 1, wherein said at least one orientation tab comprises a plurality of orientation tabs that are arranged as complimentary pairs.

11. A filter apparatus comprising:
a substantially cylindrical filter housing having an inlet opening and an outlet opening, said filter housing having:
a plurality of retention tabs positioned proximate to said outlet opening and secured to said filter housing, said retention tabs positioned to extend radially inwardly into said outlet opening;
an annular flange disposed radially about said outlet opening;
an outlet connection fitting having:
a mid portion having two ends;
a connection adapter secured to one end of said mid portion;
an annular flange secured to an other end of said mid portion;
a tube segment secured to said annular flange, said tube segment sized and configured to be received into at least a portion of said outlet opening of said filter housing when in an installed position, said annular flange sized and configured to closeably mate with said annular flange of said filter housing when in said installed position;
a sensor fitting secured to said outlet connection, said sensor fitting having an opening therethrough in fluid communcation with an interior portion of said outlet connection;
at least one orientation tab secured to an outside surface of said tube segment and positioned to be engageable between a portion of said plurality of retention tabs when in said installed position;
a retention flange secured to said tube segment and extending radially from said tube segment, said retention flange sized and configured to retentively engage with at least a portion of said retention tabs when in said installed position, said engagement of said retention tabs with said retention flange securing said connection fitting to said filter housing; and
a retention bevel secured to said tube segment and mated against one face of said retention flange, said retention bevel sized and configured to urge at least a portion of said retention tabs to deflect sufficiently during connection fitting installation to permit said retention tabs to retentively engage said retention flange;
wherein said retention tabs are disposed in a spaced relationship about said at least one opening, said spaced relationship in cooperation with said at least one orientation tab permitting selection of an intended rotational lock position from a plurality of lockable rotational positions of said connection fitting relative to said filter housing;
wherein said retention tabs have a "J" shape with a top portion of said "J" configured to retentively engage said retention flange of said connection fitting;
wherein a leg portion of said "J" shaped retention tabs is deflected by said retention flange during installation of said connection fitting in said filter housing; and
wherein said retention tabs are sufficiently elastic to permit said deflection.

* * * * *